(12) United States Patent
Pastor

(10) Patent No.: US 10,963,879 B2
(45) Date of Patent: Mar. 30, 2021

(54) SALE AUTHORIZATION SYSTEM

(71) Applicant: NCR Corporation, Duluth, GA (US)

(72) Inventor: Jason Thomas Pastor, Canton, GA (US)

(73) Assignee: NCR Corporation, Atlanta, GA (US)

(*) Notice: Subject to any disclaimer, the term of this patent is extended or adjusted under 35 U.S.C. 154(b) by 478 days.

(21) Appl. No.: 15/470,090

(22) Filed: Mar. 27, 2017

(65) Prior Publication Data
US 2018/0276671 A1    Sep. 27, 2018

(51) Int. Cl.
| | |
|---|---|
| *G06Q 20/40* | (2012.01) |
| *G06K 9/32* | (2006.01) |
| *G06K 9/00* | (2006.01) |
| *G07F 13/02* | (2006.01) |
| *G06Q 20/32* | (2012.01) |
| *G06Q 20/14* | (2012.01) |

(52) U.S. Cl.
CPC ... *G06Q 20/40145* (2013.01); *G06K 9/00771* (2013.01); *G06K 9/3258* (2013.01); *G06Q 20/145* (2013.01); *G06Q 20/32* (2013.01); *G06Q 20/3278* (2013.01); *G07F 13/025* (2013.01); *G06K 9/00087* (2013.01); *G06K 9/00288* (2013.01); *G06K 9/00617* (2013.01); *G06K 9/00885* (2013.01); *G06K 2209/01* (2013.01); *G06K 2209/15* (2013.01)

(58) Field of Classification Search
CPC .............. G06Q 20/40145; G06Q 20/4016
USPC .......................................................... 705/44
See application file for complete search history.

(56) References Cited

U.S. PATENT DOCUMENTS

| | | | | |
|---|---|---|---|---|
| 2006/0202027 | A1* | 9/2006 | Demere ................. | G06Q 20/40 235/381 |
| 2007/0055888 | A1* | 3/2007 | Miller .................... | G06F 21/32 713/186 |
| 2014/0068722 | A1* | 3/2014 | Hayat .................... | G06Q 20/02 726/4 |
| 2014/0285315 | A1* | 9/2014 | Wiewiora ............. | G07C 9/00158 340/5.53 |
| 2016/0307185 | A1* | 10/2016 | Betancourt ............ | G07F 13/00 |
| 2017/0308965 | A1* | 10/2017 | Morris .................... | B67D 7/04 |

FOREIGN PATENT DOCUMENTS

GB        2441384 A    *    3/2008    ............. B67D 7/068

OTHER PUBLICATIONS

Gas Station Car Sensor, ip.com, Dec. 11, 2000. (Year: 2000).*

* cited by examiner

*Primary Examiner* — Jessica Lemieux
(74) *Attorney, Agent, or Firm* — Schwegman, Lundberg & Woessner

(57) ABSTRACT

Systems and methods for a sale authorization include detecting vehicle information. A secondary authorization parameter is received and the sale is authorized in response to the secondary authorization parameter being associated with the vehicle information.

12 Claims, 3 Drawing Sheets

SALE AUTHORIZATION SYSTEM

BACKGROUND

Purchasing fuel can be a relatively slow process for a consumer. They typically have to navigate a multi-step process in order to be authorized to purchase fuel. For example, the consumer needs to take out their form of payment (e.g., credit card, debit card) from a wallet or purse. The card is then swiped through a card reader. Some form of identity verification is then performed for the card, such as the consumer entering the postal zip code of the billing address assigned to that card. Depending on the fuel station, the consumer may also need to enter loyalty information for any loyalty program implemented by the station. The consumer then has to wait for the credit card approval before being allowed to activate the pump. For a consumer that is in a hurry or standing out in inclement weather, the extra time to go through all of these steps can be a burden for the consumer.

SUMMARY

Devices and methods for sale authorization may include detecting a vehicle identification. A secondary authorization parameter is received and sale authorization is enabled in response to the secondary authorization parameter being associated with the vehicle identification.

BRIEF DESCRIPTION OF THE FIGURES

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Conventional fuel dispensing authorization methods can slow down the process of dispensing fuel to the customer. This is bad for both the customer, who may have to stand in inclement weather getting authorized, and the retailer who would like to get as many customers using the fuel pump in a given period of time as possible.

Conventional fuel dispensing authorizations typically need the customer to remove the form of payment (e.g., credit card, debit card) and swipe the card through a card reader. Some form of identity verification is then performed by the system for the card, such as the consumer entering the postal zip code of the billing address assigned to that card. The consumer then has to wait for the credit card approval before being allowed to activate the pump. If the retailer has any kind of loyalty program, the customer authorization process may take even longer for the customer to enter the loyalty information.

Present embodiments are able to speed up the authorization for a sale by detecting a vehicle's identification (e.g., license plates). A secondary authorization parameter is then received from the customer and it is determined if that secondary authorization parameter is associated with the vehicle identification. If the secondary authorization parameter is found to be associated with the vehicle identification, the sale is authorized.

The subsequent discussion refers to fuel dispensing for purposes of illustration of a method for authorizing a sale. However, other embodiments may use the detection of the vehicle identification and associated secondary authorization parameter to authorize a sale. For example, present embodiments for authorizing a sale may be used in drive through restaurants, car washes, electric vehicle charging stations, or other situations using a vehicle.

Figure 1:
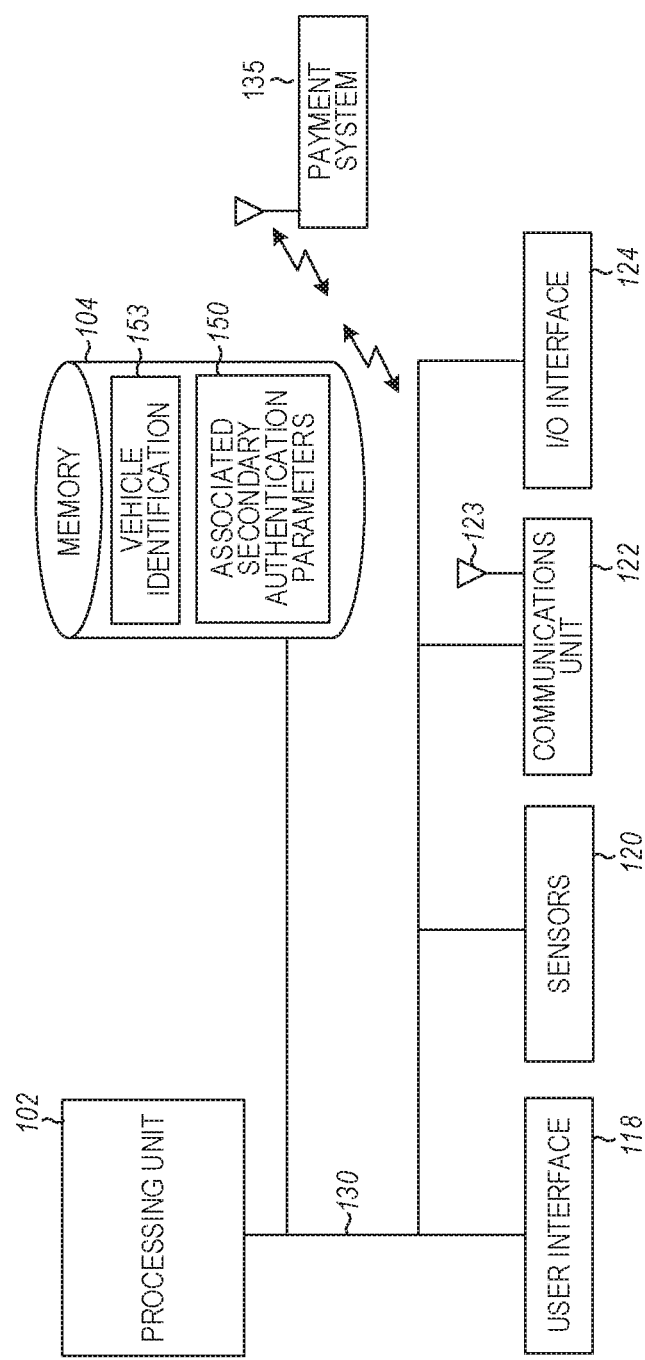
FIG. 1 shows a block diagram of an embodiment of a system for sale authorization.
Figure 3:
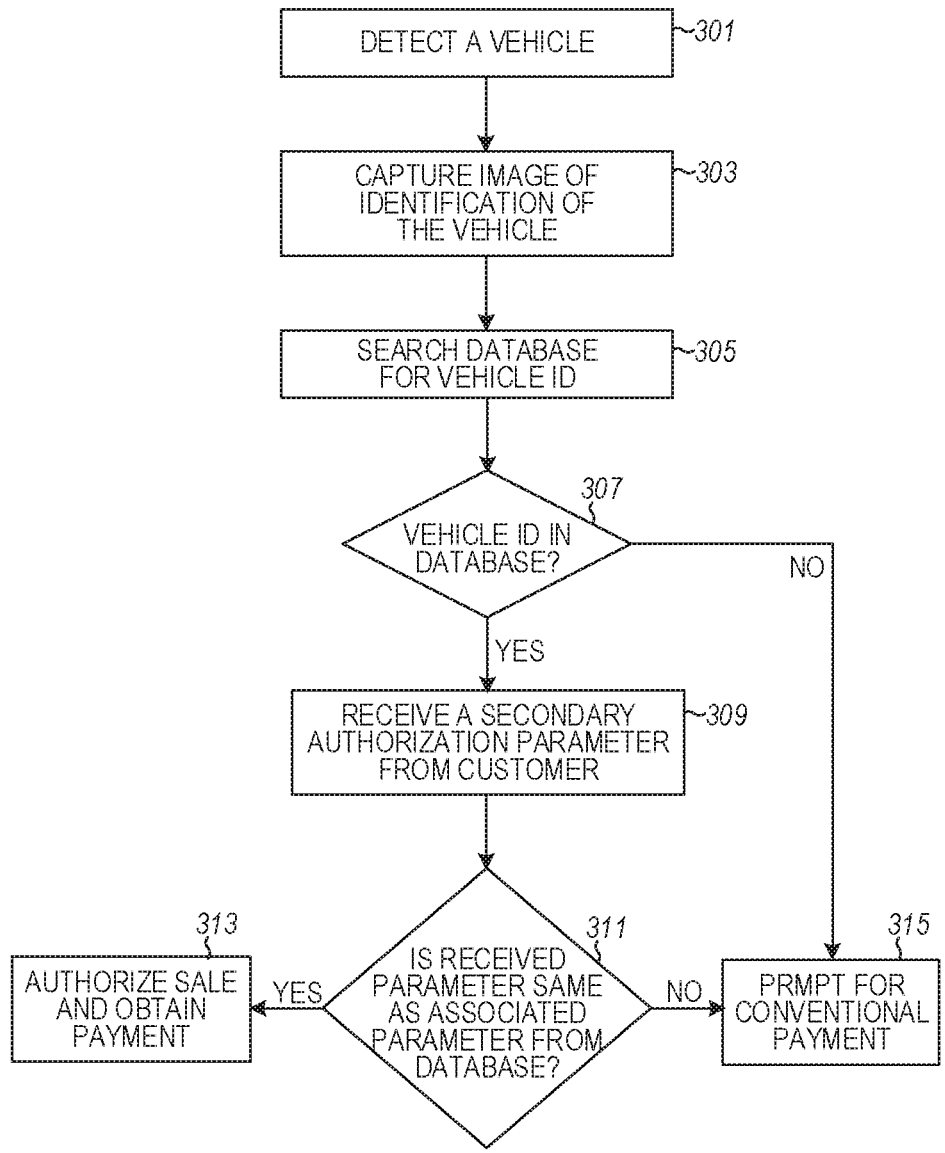
FIG. 3 shows a flowchart of an embodiment of a method for sale authorization.

FIG. 1 shows a block diagram of an embodiment of a system for sale authorization. The system may take the form of a computing device to execute instructions for performing a fuel dispenser authorization method, such as illustrated in FIG. 3.

A processing unit 102 may include one or more processors or other control circuitry. For example, the processing unit 102 may include one or more central processing units (CPUs), microprocessors, and/or dedicated controllers (e.g., application specific integrated circuits (ASIC)). If the processing unit 102 includes multiple processors, the processors may be physically located at different locations. For example, one processor may be located at the retail location to control the operation of the system while another processor may be located in a different location performing a different function.

Memory 104 may include any type of long or short term data storage. For example, the memory 104 may include semiconductor memory such as random access memory (RAM), read only memory (ROM), or flash memory (e.g., solid state drive (SSD)). The memory 104 may also include magnetic disk memory (e.g., hard disk drive (HDD)), optical memory, or magnetic tape memory. The memory block 104 represents multiple instances of memory of different types and different physical locations.

The memory 104 may store instructions that make up one or more applications executable by the processing unit 102. The memory 104 may also store a database comprising vehicle information (e.g., vehicle type, model, color, owner, identification) 153. The database may also store secondary authentication parameters 150 that are each associated with a respective vehicle identification 153.

A user interface 118 may include any number of devices that allow a user to interface with the system. Examples of user interfaces 118 may include a keypad, a keyboard, a microphone, a touchscreen display, or a camera. The user (e.g., customer) may use any one or more of these user interfaces 118 to provide user inputs to a client application executing on the computing device.

Examples of user inputs may include the user operating the keypad, keyboard, or touchscreen display for inputting data into the system (e.g., secondary authorization parameters). User inputs may also include the user speaking (e.g., aural expression) into the microphone for inputting data into the system. The data may include the customer's personal identification number (PIN) or other identifying information.

Sensors 120 include microphones, cameras, or electromagnetic sensors (e.g., echo location sensors, infrared (IR) sensors, lasers, and/or light detectors). For example, the microphones may be used to detect noise of a vehicle arriving as well as the customer speaking. The customer may use the microphone to enter the secondary authorization parameters. A camera (e.g., imaging device) may be used to detect an image of a vehicle arriving as well as detecting the identification of the vehicle (e.g., license plate characters). A camera may also be used for facial recognition of the customer, finger print of the customer, or a retina scan of the customer to provide the secondary authorization parameters. The echo location sensors, IR sensors, lasers, and light detectors may be used to detect the arrival of the vehicle based on a heat signature and/or bouncing back of light or sound to their appropriate sensors.

A communications unit 122 with antenna 123 enables the system to communicate over a wired or wireless channel with another computing device, computer server, or network (e.g., local area network, wide area network, personal area network). For example, the communications unit 122 may include radios for communicating over a wireless channel using any radio access technology (e.g., Bluetooth®, WiFi, cellular, near field communications (NFC)), Ethernet cards for using Ethernet protocols over a wired channel, or near-field communications modules. Radios in the communications unit 122 may transmit and receive over the antenna 123 coupled to the communications unit 122. The communications unit 122 may be used for transmitting any detected images of the vehicle or customer to another location for further processing.

The input/output (I/O) interface 124 enables the computing device to receive and output information. For example, the I/O interface 124 may include printers, scanners, speakers, or displays for displaying prompts to a customer or generating an aural announcement prompt.

The various components of the system may be located in one location at the retailer (e.g., in the pump, distributed between the pump and the retailer building) or the components may be distributed between the retailer location and distant locations and connected by wired or wireless communications. Other embodiments may combine the various components. For example, the user interface 118 and sensors 120 may be one unit and the communications unit 122 may be used as a sensor to detect Bluetooth or WiFi communications.

The system for sale authorization may interface with a payment system 135 that is owned and/or operated by a financial institution. The payment system may include a Point-of-Sale (POS) system and/or other payment systems. Once the identity of the customer has been verified by the system as discussed subsequently, the authorization to charge the customer's card may be transmitted to the financial institution/POS 135 in order to obtain payment by the retail location. The transmission may be over a wireless channel, as shown, or over a wired channel.

Figure 2:
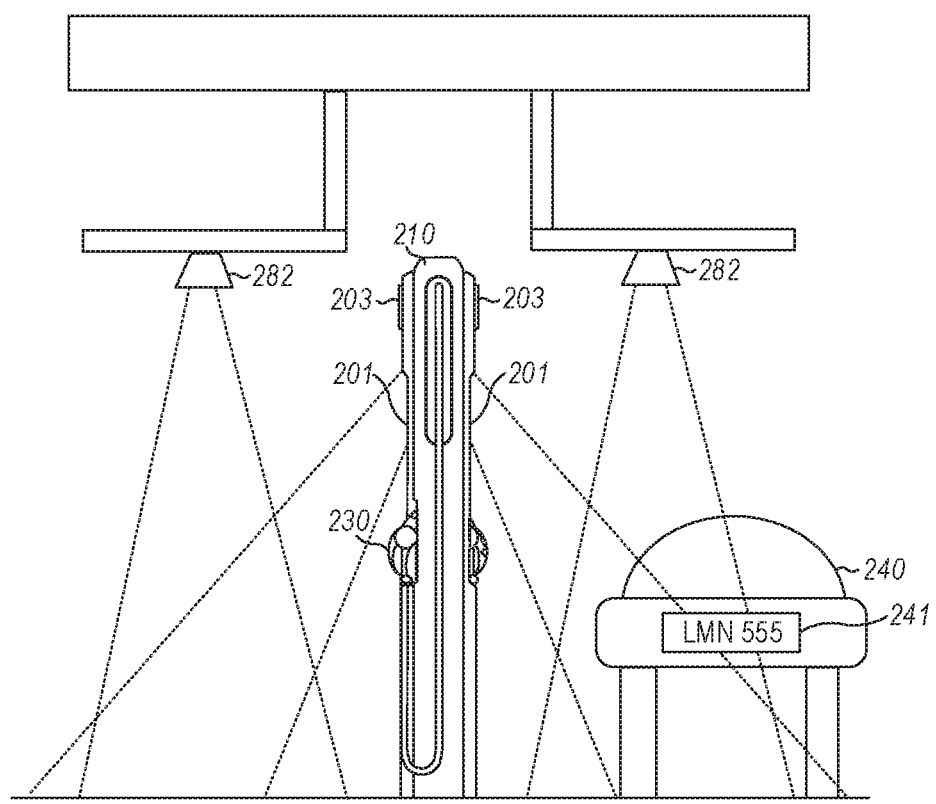
FIG. 2 shows a diagram of an embodiment of the fuel dispenser system.

FIG. 2 shows a diagram of an embodiment of the fuel dispenser system. The system may incorporate various components of the block diagram of FIG. 1. For example, the sensors 120, user interface 118, communications unit 122, and I/O interface 124 may be located at the fuel dispenser system while the processing unit 102 and memory 104 are located in the retailers building in order to handle all of the fuel dispensers at that location. In another embodiment, all of the components of FIG. 1 may be located within the fuel dispenser body 210. In yet another embodiment, the memory 104 that holds the database of vehicle identifications and associated secondary authentication parameters as well as one or more processors of the processing unit 102 may be located in the Internet cloud.

The system includes the fuel dispenser body 210 that houses the pumps and other necessary hardware for pumping fuel into a customer's vehicle. For example, a dispensing nozzle 230 is coupled to a hose that is coupled to a pump (not shown) for pumping fuel out of an underground tank. The fuel dispenser body 210 also includes any displays 201 for prompting the customer for secondary authentication parameters or other information. A sensor 201 may include one or more of a camera for detecting an image of the vehicle 240 or the vehicle license plate 241. The sensor 201 may also include a camera for detecting an image of the customer (e.g., facial, retina).

Another sensor 282 may include another camera for detecting the arrival of the vehicle 240. The sensor 282 may also be one or more of an IR sensor, a laser, an echo-location sensor, and/or a light detector for detecting the arrival of the vehicle 240. The sensor 282 may capture an image of the vehicle to detect its type, model, and color.

FIG. 3 shows a flowchart of an embodiment of a method for sale authorization. In block 301, a vehicle is detected. As shown in FIG. 2, the arrival of the vehicle is detected as it approaches a sales point (e.g., the fuel dispenser body 210, car wash, drive through restaurant) by any of various way including pressure strips on the ground, IR sensors, laser sensors, echo-location sensors, or image sensors.

In block 303, an image is captured of the identification of the vehicle. For example, a camera may capture one or more images of the vehicle and its license plate to detect the vehicle's information (e.g., identification, type, model, color). While FIG. 2 shows a camera capturing an image of the rear license plate, one of ordinary skill in the art would realize that cameras in other location at the fuel dispenser can capture an image of the front license plate as well.

In detecting the license plate number of the vehicle, the method may perform an optical character recognition (OCR) algorithm on the captured image or images in order to determine the license plate number. Any form of character recognition algorithm may be used in determining the license plate number.

The image may be used to determine other information about the vehicle such as color and model. The other information may be compared with any additional vehicle information stored in the database. In an embodiment, the license plate number can be compared with the detected vehicle type, model, and color to determine if the plate has been stolen. In such an instance, the sale would not be authorized.

The vehicle information may also be used to determine which of multiple best guesses of license plate numbers are more likely to be accurate. Since the OCR algorithm may produce more than one result from processing the image of the license plate (e.g., due to dirt on plate or on camera), the results from the OCR algorithm can be compared to the vehicle information stored with the license plate number to further refine the determination of the correct license plate number from a plurality of OCR algorithm outputs.

Once the license plate number of the vehicle is known, in block 305, a database of license plate numbers is searched to determine if the license plate number is in the database and if it has an associated secondary authorization parameter. The database may be set up by the fuel retailer using customers that have registered with that retailer. During the registration process, customers will have given the retailer their vehicle information that may include the vehicle(s) license plate number, associated vehicle type, model, and/or color. Along with the information, the customer will have provided the retailer with a secondary authorization parameter to be associated with each of the customer's license plate numbers. The associated secondary authorization parameter is stored in the database such that it is associated with the respective license plate number of numbers of the customer.

The secondary authorization parameter may be gathered in an active or passive manner. For example, in an active gathering of the secondary authorization parameter, the customer can input a personal identification code, voice sample, or actively place their finger on a biometric scanner. In a passive gathering of the secondary authorization parameter, the customer may provide one or more of their finger prints on a strategically placed biometric scanner (e.g., in handle of fuel pump hose handle), retina scan, or facial image. In the event of receiving a passive secondary authorization parameter, the customer may need or want to confirm the use of the automatic payment method. This may be accomplished by default (e.g., customer goes through with transaction, pumps gas) or by a positive gesture from the customer to a camera (e.g., hand up, thumb up). If the sale is at a fuel filling station, the gesture may include the customer putting the filling nozzle into the vehicle.

The customer may also provide the retailer with an authorization from a mobile device that is associated with the customer such as a smartphone or smartwatch. If the smartphone or smartwatch are NFC capable, the customer can go through the authentication process on the mobile device (finger print, retina scan, voice match) and communication between the mobile device and the system may be over NFC, local networks (e.g., WiFi, Bluetooth) or remote networks.

During the registration process, the customer provides the retailer with one or more forms of payment to be stored in the database for use when the customer is approved for purchasing fuel. For example, the user may store one or more credit cards, debit cards, or bank account numbers to be associated with his or her vehicle license plate number.

In block 307, the search determines if the vehicle identification and associated secondary authorization parameter are in the database. If not, the customer is not in the retailer's database and the customer is prompted for conventional payment information such as credit or debit card at block 315. In another embodiment, if the customer is not in the retailer's database, the customer may be prompted to start the registration process in order to enter their vehicle identification and secondary authorization parameter.

If the vehicle identification is in the database, in block 309 the secondary authorization parameter is received from the customer. This may be an active or passive gathering of the parameter as discussed previously. In an embodiment, the system may prompt the customer by an aural announcement over a speaker, a prompt on a display or both. The prompting may also be a text or other prompt on the customer's mobile device. The customer may then respond to the prompt to authorize the sale.

In block 311, the received secondary authentication parameter is compared to the associated secondary authentication parameter that is associated with the vehicle identification in the database. If the received secondary authentication parameter does not match the stored associated secondary authentication parameter, the customer is prompted for conventional payment at block 315. If the received secondary authentication parameter matches the stored, associated secondary authentication parameter, the sale authorization is enabled at block 313 (e.g., fuel dispensing is enabled).

In another embodiment, the system may perform a business intelligence fraud check on the customer. For example, if two cars are associated with the same bank card, it is possible that both cars may be attempting to refuel at the same time but unlikely that any one of the cars would need to refuel multiple times in a relatively short period. This fraud check would determine one car might be refueling too often.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method for sale authorization comprising:
   determining, by instructions that execute on a processor, a vehicle has arrived at a location based on output from a plurality of sensors comprising: microphones, cameras, electromagnetic sensors, Infrared (IR) sensors, lasers, or light detectors;
   detecting, by the instructions, a vehicle information, wherein detecting further includes performing image processing on a vehicle image of the vehicle captured by at least one of the cameras and obtaining the vehicle information based on the image processing, wherein detecting further includes comparing the vehicle information against registered vehicle information registered for customers of a retailer associated with the location;
   receiving, by the instructions, a secondary authorization parameter, wherein the second authorization parameter is captured passively from one or more of the sensors and associated with a registered customer; and
   enabling, by the instructions, the sale in response to the secondary authorization parameter being associated with the vehicle information when the secondary authorization parameter is verified as the registered customer, wherein enabling further includes processing a registered form of payment that was registered by the registered customer and completing a purchase made by the registered customer with the retailer based on verification of the vehicle information and verification of the secondary authorization parameter at the location.

2. The method of claim 1, wherein detecting the vehicle information comprises detecting a license plate number of the vehicle, a vehicle color, a vehicle type, or a vehicle model.

3. The method of claim 2, wherein detecting the license plate number of the vehicle comprises:
   capturing an image of the license plate; and
   performing character recognition of the image to determine the detected license plate number.

4. The method of claim 3, wherein enabling the sale in response to the secondary authorization being associate with the vehicle identification comprises:
   searching a database comprising a plurality of license plate numbers each with an associated secondary authorization parameter;
   retrieving the secondary authorization parameter associated with the detected license plate number; and
   comparing the retrieved associated secondary authorization parameter with the received secondary authorization parameter.

5. The method of claim 1, wherein receiving the secondary authorization parameter comprises obtaining an image of the registered customer comprising at least one of a facial image or a gesture by the customer.

6. The method of claim 1, wherein receiving the secondary authorization parameter comprises obtaining a finger print of the registered customer.

7. The method of claim 1, wherein receiving the secondary authorization parameter comprises performing a retina scan of the registered customer.

8. A method for fuel dispensing authorization comprising:
detecting, by instructions that execute on a processor, a vehicle arriving at a location based on output from a plurality of sensors comprising: microphones, cameras, electromagnetic sensors, Infrared (IR) sensors, lasers, or light detectors;
capturing, by the instructions, an image of an identification of the vehicle by determining the identification from the image by performing image processing on the image as provided and captured by one of the cameras;
searching, by the instructions, a database for the identification of the vehicle by searching registered vehicle identification information for registered customers of a retailer;
when the identification of the vehicle is found in the database in the registered vehicle identification information, passively capturing a secondary authorization parameter from the customer through one of the sensors;
receiving, by the instructions, the secondary authorization parameter for the customer;
comparing, by the instructions, the received secondary authorization with an associated secondary authorization parameter from the database that is associated with the identification of the vehicle, wherein comparing further includes obtaining the received secondary authorization parameter against a registered secondary authorization parameter that was registered by the customer; and
enabling, by the instructions, fuel dispensing in response to the received secondary authorization parameter being equal to the associated secondary authorization parameter, wherein enabling further includes processing a registered form of payment that was registered by the customer and completing a purchase made by the registered customer with the retailer at the location based on verifying the identification of the vehicle and verifying the received secondary authorization.

9. The method of claim 8, wherein detecting the vehicle comprises detecting an image of the vehicle.

10. The method of claim 8, wherein the received secondary authorization parameter comprises a voice signal from the customer and comparing the received secondary authorization with the associated secondary authorization parameter comprises comparing the voice signal from the customer with a stored voice signal representing the customer and associated with the identification of the vehicle.

11. A system for fuel dispenser authorization, the system comprising:
a processor; and
a memory that includes instructions that, when executed by the processor, cause the processor to perform data processing activities comprising:
detecting a vehicle arriving at a location based on output from a plurality of sensors comprising: microphones, cameras, electromagnetic sensors, Infrared (IR) sensors, lasers, or light detectors;
capturing an image of an identification of a vehicle by using one of the cameras to provide the image and performing image processing on the image to obtain the identification;
searching a database for the identification and an associated secondary authorization parameter, wherein the identification and the associated secondary authorization parameter are registered with a customer for a retailer;
when the identification is found in the database, passively obtaining a secondary authorization parameter for the customer from a biometric scanner integrated into a handle of a fuel dispenser that captures a finger print of the customer when the handle is grabbed by the customer;
comparing the secondary authorization with the associated secondary authorization parameter linked to the identification; and
enabling fuel dispensing of the fuel dispenser in response to the secondary authorization parameter being equal to the associated secondary authorization parameter wherein enabling further includes processing a registered form of payment that was registered by the customer and completing a purchase made by the customer with the retailer at the location based on verification of the identification and verification of the secondary authorization.

12. The system of claim 11, wherein the system is further configured to perform a business intelligence fraud check to verify an identity of the customer.

* * * * *